(12) United States Patent
Heath et al.

(10) Patent No.: US 11,784,905 B2
(45) Date of Patent: Oct. 10, 2023

(54) METHOD AND APPARATUS FOR ENSURING CONTINUED DEVICE OPERATIONAL RELIABILITY IN CLOUD-DEGRADED MODE

(71) Applicant: Google LLC, Mountain View, CA (US)

(72) Inventors: Taliver Heath, Mountain View, CA (US); Kate Harrison, Mountain View, CA (US); Yi Hsuan, Mountain View, CA (US); Mathew Varghese, Los Altos, CA (US); Karthik Yogeeswaran, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/938,565

(22) Filed: Oct. 6, 2022

(65) Prior Publication Data

US 2023/0030237 A1 Feb. 2, 2023

Related U.S. Application Data

(63) Continuation of application No. 17/278,649, filed as application No. PCT/US2019/054038 on Oct. 1, 2019, now Pat. No. 11,496,383.

(51) Int. Cl.
*H04L 43/10* (2022.01)
*H04L 41/0896* (2022.01)
*H04L 43/0817* (2022.01)

(52) U.S. Cl.
CPC .......... *H04L 43/10* (2013.01); *H04L 41/0896* (2013.01); *H04L 43/0817* (2013.01)

(58) Field of Classification Search
CPC .. H04L 41/0896; H04L 43/0817; H04L 43/10
See application file for complete search history.

(56) References Cited

U.S. PATENT DOCUMENTS

| 8,095,828 B1 | 1/2012 | Westerberg |
| 2004/0181598 A1 | 9/2004 | Paya |

(Continued)

FOREIGN PATENT DOCUMENTS

| KR | 20030048503 A | 6/2003 |
| KR | 20140079865 A | 6/2014 |

OTHER PUBLICATIONS

International Search Report and Written Opinion for the PCT Application No. PCT/US2019/054038 dated Dec. 11, 2019.

(Continued)

*Primary Examiner* — Anh Nguyen
(74) *Attorney, Agent, or Firm* — Honigman LLP; Brett A. Krueger

(57) ABSTRACT

In the presence of a network fault condition preventing communication between a communication device and a network device of a first network, a method includes receiving a heartbeat request from the communication device requesting permission for the communication device to perform a device operation. The method further includes obtaining device state data associated with the communication device and determining whether the communication device is permitted to perform the device operation based on the device state data associated with the communication device. When the communication device is permitted to perform the device operation, the method also includes transmitting a heartbeat confirmation signal to the communication device. The heartbeat confirmation signal permits the communication device to perform the device operation.

18 Claims, 7 Drawing Sheets

(56) References Cited

U.S. PATENT DOCUMENTS

| | | | |
|---|---|---|---|
| 2007/0041327 A1* | 2/2007 | Foster | H04L 67/14 370/242 |
| 2014/0079865 A1 | 3/2014 | Bjerrum et al. | |
| 2014/0095925 A1* | 4/2014 | Wilson | G06F 11/2038 714/E11.089 |
| 2016/0210209 A1 | 7/2016 | Verkaik et al. | |
| 2017/0251063 A1* | 8/2017 | Tang | H04L 67/01 |
| 2019/0306027 A1 | 10/2019 | Killadi | |

OTHER PUBLICATIONS

USPTO, Office Action relating to U.S. Appl. No. 17/278,649, dated Feb. 16, 2022.

Korean Office Action and its translation for the related Korean Patent Application No. 10-2021-7008784, dated Nov. 18, 2022, 118 pages.

* cited by examiner

METHOD AND APPARATUS FOR ENSURING CONTINUED DEVICE OPERATIONAL RELIABILITY IN CLOUD-DEGRADED MODE

CROSS REFERENCE TO RELATED APPLICATIONS

This U.S. patent application is a continuation of, and claims priority under 35 U.S.C. § 120 from, U.S. patent application Ser. No. 17/278,649, filed on Mar. 22, 2021, which is a national stage application of, and claims priority under 35 U.S.C. § 371 from PCT/US2019/054038, filed on Oct. 1, 2019, which claims priority under 35 U.S.C. § 119(e) to U.S. Provisional Application 62/743,040, filed on Oct. 9, 2018. The disclosures of these prior applications are considered part of the disclosure of this application and are hereby incorporated by reference in their entireties.

TECHNICAL FIELD

This disclosure relates to reliable operation of network-connected devices in a cloud-degraded mode.

BACKGROUND

There are cloud services that require very high degrees of operational reliability to support internet of things (IoT) devices and other devices. The devices tend to need a heartbeat (also referred to as a keep alive signal) back from the cloud-environment to ensure that the device may continue to do the task or operation that was ongoing. At the point that the devices become critical, an issue arises that the cloud service becomes a large part of the total system reliability.

Some ways to increase reliability of cloud services include duplicating the entire system in more than one location, effectively providing N+1 redundancy. However, this technique is difficult to manage, and full consistency between the two systems can be complex and costly

SUMMARY

A primary network, such as a primary cloud network includes a network device such as one or more servers, that stores device state data for various devices that are in communication with the primary network. For example, the devices include internet of thing (IoT) devices, wireless base stations, end-user devices (wireless mobile and wired devices) or any other devices. A backup network device, such as one or more servers, in a secondary network such as a secondary cloud network, in one example, is a smaller system and backs up a subset of the state data that is kept by the primary network. In some implementations, the backup device in the secondary network keeps a copy of valid heartbeat confirmation data (keep alive signal data) that is obtained from the primary network. In one example, only keep alive signal data is backed up by the secondary network. However, any suitable subset of device state data may also be backed up as long as it includes the backup of the keep alive data, also referred to as heartbeat confirmation data.

In some implementations, a system is composed of a primary service provided by one or more servers in the primary cloud infrastructure and a heartbeat-only system (HBO) that is maintained through a backup device in a secondary cloud infrastructure. The secondary network is used during a fault condition that occurs in connection with the primary network. The system, method, and apparatus in some implementations also allow an invalidation agent to invalidate heartbeat confirmation data before, during, or after the fault condition.

The heartbeat confirmation data is data indicating that the device was ok to continue operations with the primary cloud. In one example, the heartbeat confirmation data is stored in a table in the secondary network, allowing a second system to provide maximum separation without having a fully rewritten software service. This allows for the maintaining of consistent operation of an IoT device or other device even during a fault condition of the primary network without having to have full consistent copies of state data at all times across multiple cloud infrastructures, as well as having a smaller, independent service to ensure reliability across portions of the cloud networks. Serving heartbeats may be replicated with significantly simpler states to the point of potentially a static web page handler. However, any suitable operation may be employed to serve heartbeats. The secondary cloud system being updated by the primary cloud system with device heartbeat confirmation data makes maintaining the consistent state significantly simpler.

Aspects of the present disclosure provide for reliable operation of network-connected devices in a cloud-degraded mode. One aspect of the disclosure provides a method for providing operational reliability of a communication device adapted to communicate with a first network. In the presence of a network fault condition preventing communication between the communication device and a network device of the first network, the method includes receiving, at data processing hardware of a secondary network, a heartbeat request from the communication device requesting permission for the communication device to perform a device operation. The method further includes obtaining, by the data processing hardware, device state data associated with the communication device. The method also includes determining, by the data processing hardware, whether the communication device is permitted to perform the device operation based on the device state data associated with the communication device. When the communication device is permitted to perform the device operation, the method also includes transmitting, by the data processing hardware, a heartbeat confirmation signal to the communication device. The heartbeat confirmation signal permits the communication device to perform the device operation.

Implementations of the disclosure may include one or more of the following optional features. Obtaining the device state data may include receiving the device state data associated with the communication device from the network device of the first network. In some implementations, when the device state data is received before receiving the heartbeat request from the communication device and when the network fault condition is not present, the method includes storing the device state data in a backup datastore, retrieving the device state data from the backup datastore using a device identifier identifying the communication device, and associating the communication device with the device state data stored in the backup datastore. In some examples, determining whether the communication device is permitted to perform the device operation includes determining whether the device state data includes heartbeat confirmation data. The heartbeat confirmation data may indicate permission by the network device of the first network for the communication device to perform the operation. When the device state data includes heartbeat confirmation data, the method may include determining that the communication device is permitted to perform the device operation. When the device state data does not include heartbeat confirmation data, the method may include determining that the communication device is not permitted to receive the heartbeat confirmation signal. In some examples, the method includes preventing transmission of the heartbeat confirmation signal to the communication device when the device state data does not include heartbeat confirmation data, thereby preventing the communication device from performing the device operation.

In some implementations, determining that the communication device is permitted to perform the device operation includes determining whether the device state data includes invalidation data that invalidates the communication device from the ability to perform the device operation. In these implementations, when the device state data includes heartbeat confirmation data and does not include invalidation data, the method includes determining that the communication device is permitted to perform the device operation. However, when the device state data includes invalidation data as well as heartbeat confirmation data, the method may include rescinding permission for the communication device to perform the device operation and withholding transmission of the heartbeat confirmation signal to the communication device, thereby preventing the communication device from performing the operation. The invalidation data may indicate that the communication device requires a software update, the communication device is out of compliance with contractual agreements, and/or a resource necessary for the communication device to perform the device operation is unavailable to the communication device.

In some examples, the network device of the first network is configured to push device state data associated with the communication device to the data processing hardware prior to the network fault condition. Additionally or alternatively, the network device of the first network may be configured to send the device state data associated with the communication device in response to a pull operation by the data processing hardware. The device state data may include a device identifier identifying the communication device, invalidation data that invalidates the communication device from the ability to perform the device operation, operational reliability information associated with the communication device, a payment status, an ability of the communication device to update organizational metadata, and/or an aggregation calculation of overall environment health.

When the network fault condition is not present, the communication device may be configured to send the heartbeat request for permission to perform a device operation to the network device of the first network and the network device of the first network may be configured to send the heartbeat confirmation signal to the communication device. The network device may also be configured to update the device state data associated with the communication device to include the heartbeat confirmation signal sent to the communication device. In some implementations, the network fault condition is present when the communication device does not receive a heartbeat confirmation signal from the network device of the first network within a threshold period of time after sending a heartbeat request to the network device. The communication device may include an Internet of Things (IoT) device, a temperature sensor, a wireless base station, a mobile device, and/or a smart appliance.

Another aspect of the disclosure provides a system for reliable operation of network-connected devices in a cloud-degraded mode. One aspect of the disclosure includes data processing hardware of a backup network and memory hardware in communication with the data processing hardware. The memory hardware may store instructions that when executed on the data processing hardware cause the data processing hardware to perform operations. In the presence of a network fault condition preventing communication between the communication device and a network device of the first network, the operations include receiving a heartbeat request from the communication device. The heartbeat request requests permission for the communication device to perform a device operation. The operations further include obtaining device state data associated with the communication device and determining whether the communication device is permitted to perform the device operation based on the device state data associated with the communication device. When the communication device is permitted to perform the device operation, the operations include transmitting a heartbeat confirmation signal to the communication device. The heartbeat confirmation signal permits the communication device to perform the device operation.

Implementations of the disclosure may include one or more of the following optional features. Obtaining the device state data may include receiving the device state data associated with the communication device from the network device of the first network. In some implementations, when the device state data is received before receiving the heartbeat request from the communication device and when the network fault condition is not present, the operations include storing the device state data in a backup datastore, retrieving the device state data from the backup datastore using a device identifier identifying the communication device, and associating the communication device with the device state data stored in the backup datastore. In some examples, determining whether the communication device is permitted to perform the device operation includes determining whether the device state data includes heartbeat confirmation data. The heartbeat confirmation data may indicate permission by the network device of the first network for the communication device to perform the device operation. When the device state data includes heartbeat confirmation data, the operations may include determining that the communication device is permitted to perform the device operation. When the device state data does not include heartbeat confirmation data, the operations may include determining that the communication device is not permitted to receive the heartbeat confirmation signal. The operations may include preventing transmission of the heartbeat confirmation signal to the communication device when the device state data does not include heartbeat confirmation data, thereby preventing the communication device from performing the device operation.

In some implementations, determining the communication device is permitted to perform the device operation includes determining whether the device state data includes invalidation data that invalidates the communication device from the ability to perform the device operation. In these implementations, when the device state data includes heartbeat confirmation data and does not include invalidation data, the operations include determining that the communication device is permitted to perform the device operation. However, when the device state data includes invalidation data as well as heartbeat confirmation data, the operations may include rescinding permission for the communication device to perform the device operation and withholding transmission of the heartbeat confirmation signal to the communication device, thereby preventing the communication device from performing the operation. The invalidation data may indicate that the communication device requires a software update, the communication device is out of compliance with contractual agreements, and/or a resource necessary for the communication device to perform the device operation is unavailable to the communication device.

In some examples, the network device of the first network is configured to push device state data associated with the communication device to the data processing hardware prior to the network fault condition. Additionally or alternatively, the network device of the first network may be configured to send the device state data associated with the communication device in response to a pull operation by the data processing hardware. The device state data may include a device identifier identifying the communication device, invalidation data that invalidates the communication device from the ability to perform the device operation, operational reliability information associated with the communication device, a payment status, an ability of the communication device to update organizational metadata, and/or an aggregation calculation of overall environment health.

When the network fault condition is not present, the communication device may be configured to send the heartbeat request to the network device of the first network and the network device of the first network may be configured to send the heartbeat confirmation signal to the communication device. The network device may also be configured to update the device state data associated with the communication device to include the heartbeat confirmation signal sent to the communication device. In some implementations, the network fault condition is present when the communication device does not receive a heartbeat confirmation signal from the network device of the first network within a threshold period of time after sending a heartbeat request to the network device. The communication device may include an Internet of Things (IoT) device, a temperature sensor, a wireless base station, a mobile device, and/or a smart appliance.

DESCRIPTION OF DRAWINGS

Like reference symbols in the various drawings indicate like elements.

DETAILED DESCRIPTION

Figure 1:
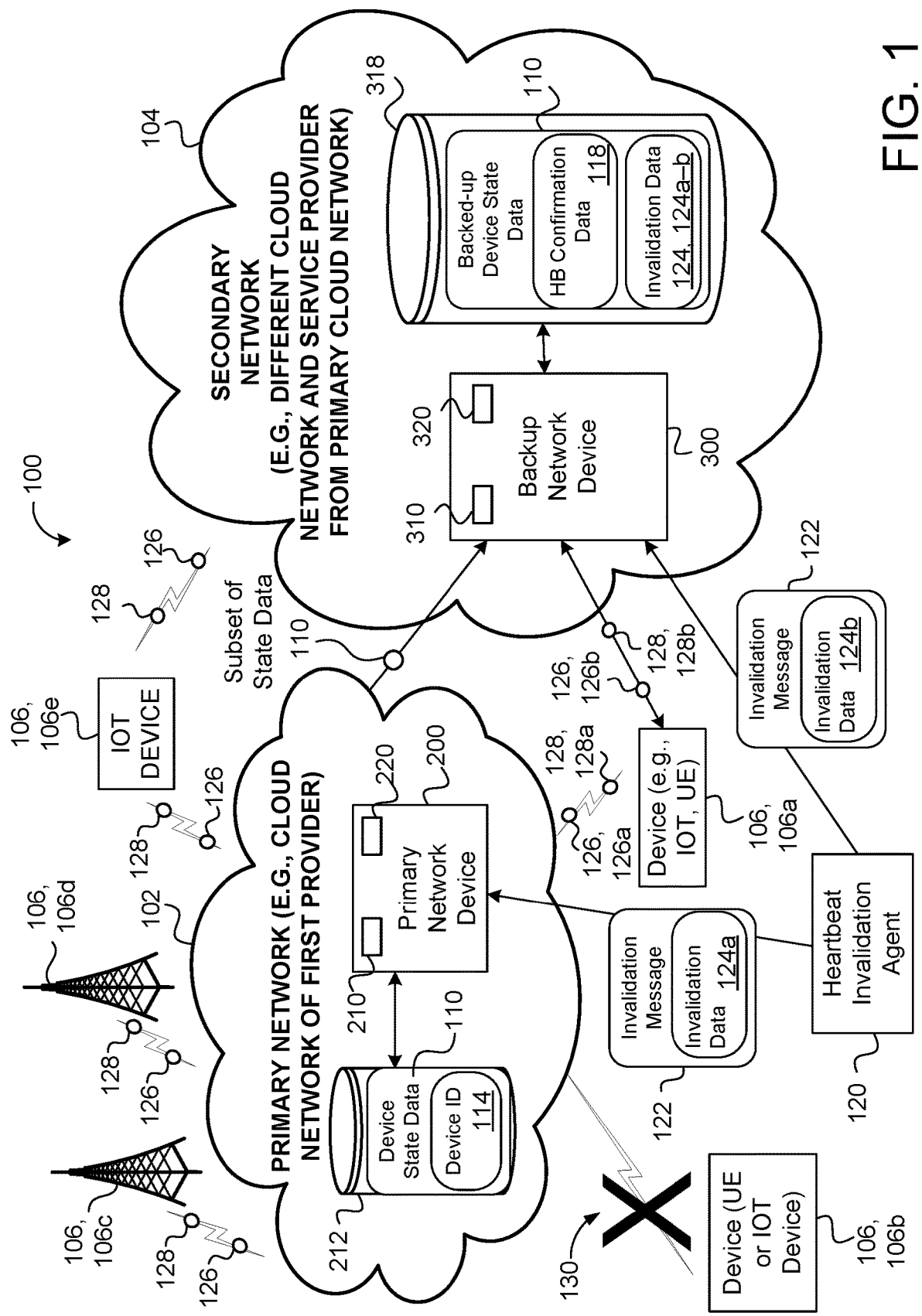
FIG. 1 is a schematic view of an example network system including a primary network and a secondary network.

FIG. 1 illustrates one example of a network system 100 that employs a primary network 102 and a secondary network 104. In one example, the primary network 102 is a cloud network infrastructure that is operated by a first provider and the secondary network 104 is a different cloud network infrastructure that is operated by a different service provider. However, any suitable network configurations may be employed. Various communication devices 106, 106a—e register and communicate with the primary network 102 through techniques including through wireless or wired interfaces. While examples of five different types of communication devices 106 are shown, any number of communication devices 106 may register and communicate with the primary network 102 at any given time. For instance, some communication devices 106a, 106b, 106e may include internet of things (IoT) devices or user equipment (UE) devices such as a temperature sensor or smart appliance in a building, or a mobile computing device (e.g., smartphone, tablet, wearable, etc.), Other communication devices 106c, 106d may include wireless base stations. In the example shown, each of the communication devices 106 communicate with the primary network 102 via internet protocol (IP)-based communication protocols or any other suitable protocols. In one example, the one or more communication devices 106 can communicate with the primary network 102 and secondary network 104 through a domain name system (DNS) as part of an Internet-based cloud network system. The primary network 102 includes a primary network device 200. The network device 200 (e.g. primary network device 200 FIG. 1)) may be one or more servers such as web servers that communicate with one or more of the communication devices 106. As such, the network device 200 includes data processing hardware 210 and memory hardware 220 in communication with the data processing hardware 210. In some examples, the network device 200 executes a software application or service, such as a Web Registration Service 202. Communication devices 106 may register with the Web Registration Service 202 to receive a heartbeat confirmation signal 126 (also referred to as a heartbeat confirmation or keep alive signal) to permit the communication devices 106 to continue to perform tasks or operations that were ongoing. All of the communication devices 106 may be of the same type, such as all IoT type devices, or may be various combinations of differing types of devices such as smartphones and wireless base stations that the smartphones may wish to employ for communication purposes. An exemplary primary network 102 includes a citizen's broadband radio services (CBRS) system; however, the primary network 102 may be any suitable system.

A communication device 106 such as an IoT device 106a sends a heartbeat request 128 to the network device 200 (e.g., data processing hardware 210) in the primary network 102 requesting that the network device 200 send back a heartbeat confirmation signal 126. The heartbeat confirmation signal 126 may include heartbeat confirmation data 118. When the IoT device 106a receives the heartbeat confirmation signal 126, the IoT device 106a continues executing a current task or operation with the primary network 102 since no network fault condition 130 is present. The communication of heartbeat requests 128 and heartbeat confirmation signals 126 between a communication device and the network device 200 can occur at least once every 20 seconds, 240 seconds, or any suitable period. In some implementations, the server 200 records device state data 110 indicating heartbeat confirmation data 118 issued to each particular communication device 106 and stores the device state data 110 together with a device identifier (ID) 114 associated with the particular communication device 106 in a device state datastore 212 in communication with the network device 200. In some examples, the device state datastore 212 resides on the memory hardware 220 of the network device 200. The device state data 110 stored in the device state datastore 212 includes other information, including information related to executing the current task or operation with the primary network 102. Device state data 110 may include, without limitation, data representing payment status, an ability to update organizational metadata, aggregation calculations of overall environment health, and/or any other suitable data. As long as the IoT device 106a receives a corresponding heartbeat confirmation signal 126 responsive to issuing a heartbeat request 128, the IoT device 106a knows that it can continue its operation with the primary network 102. However, the IoT device 106a will recognize that a network fault condition 130 occurred with the primary network 102, e.g., when a heartbeat confirmation signal 126 is not received from the primary network 102. In some examples, communication devices 106 recognize a network fault condition 130 is present when no heartbeat confirmation signal 126 is received within a predetermined period of time after issuing/sending a heartbeat request 128.

In some examples, the primary network 102 is a cloud network of a first provider. The cloud network 102 (e.g. primary network 102 (FIG. 1)) may include a Primary Network Device 200. The Primary Network Device may execute a Web Registration Service 202. In some examples, the communication device registers with the Web Registration Service 202 to perform operations with the primary network 102. The device state data 110 may be state data that is stored while the communication device 106 is performing operations with the primary cloud network. For example, when the IoT device 106a is a mobile device communicating in a CBRS system and the primary network 102 corresponds to a spectrum analysis system (SAS) of the CBRS system, the IoT device 106a may send the heartbeat request 128 to the primary network device 200 of the primary network 102 and receive a corresponding heartbeat confirmation signal 126 indicating that the IoT device 106a is able to communicate with the primary network 102. As such, the network device 200 of the primary network 102 may store the heartbeat confirmation data 118 as device state data 110 linked to the IoT device 106a via the corresponding device ID 114 in the device state datastore 212, whereby the device state data 110 indicates that an operating instance of the IoT device 106a in the primary network 102 is proper. That is, that the IoT device 106a is properly registered with the Web Registration Service 202.

Figure 4:
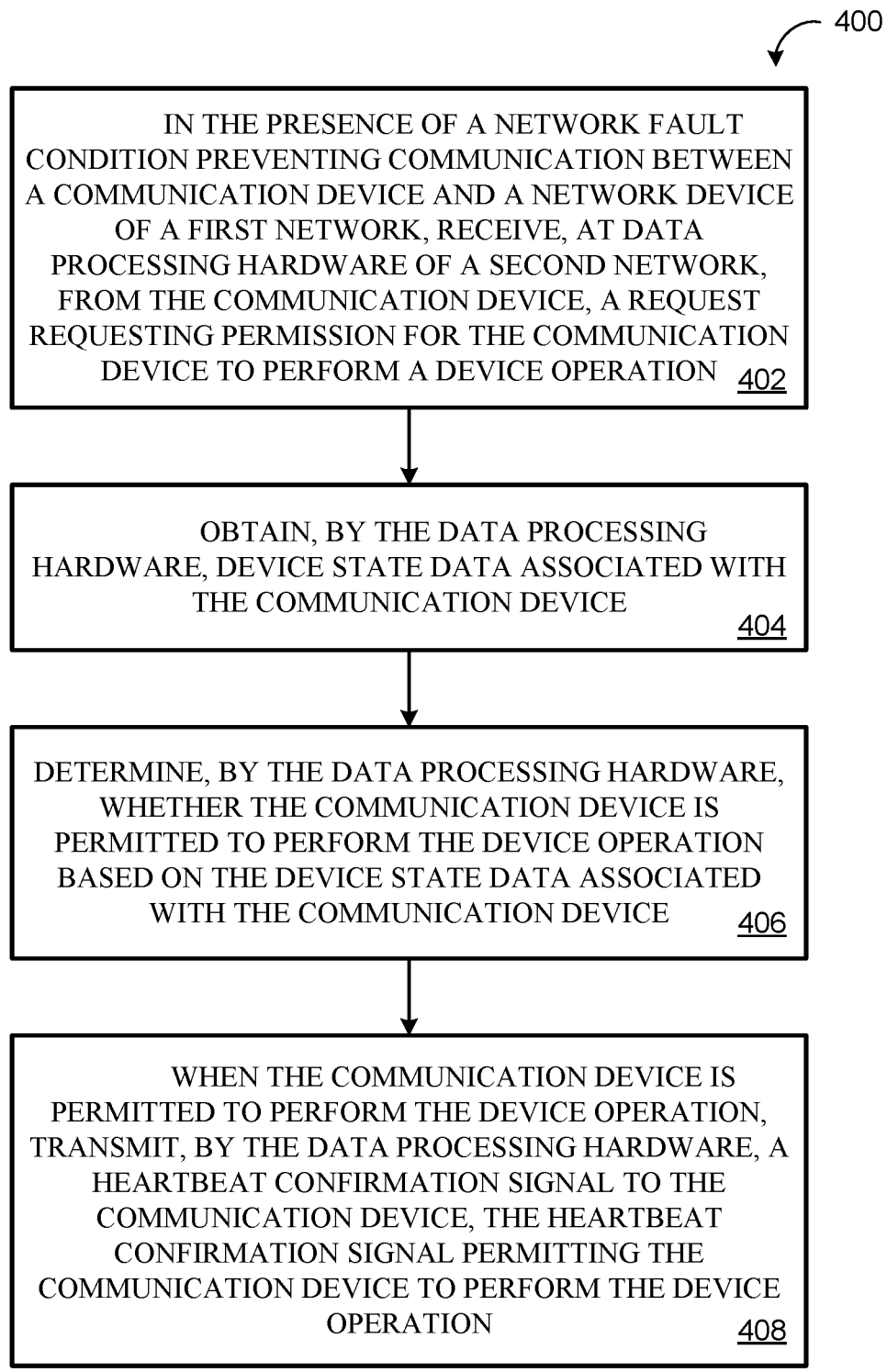
FIG. 4 is a flowchart of an example arrangement of operations for a method of providing operational reliability for a communication device adapted to communicate with a primary network.
Figure 5:
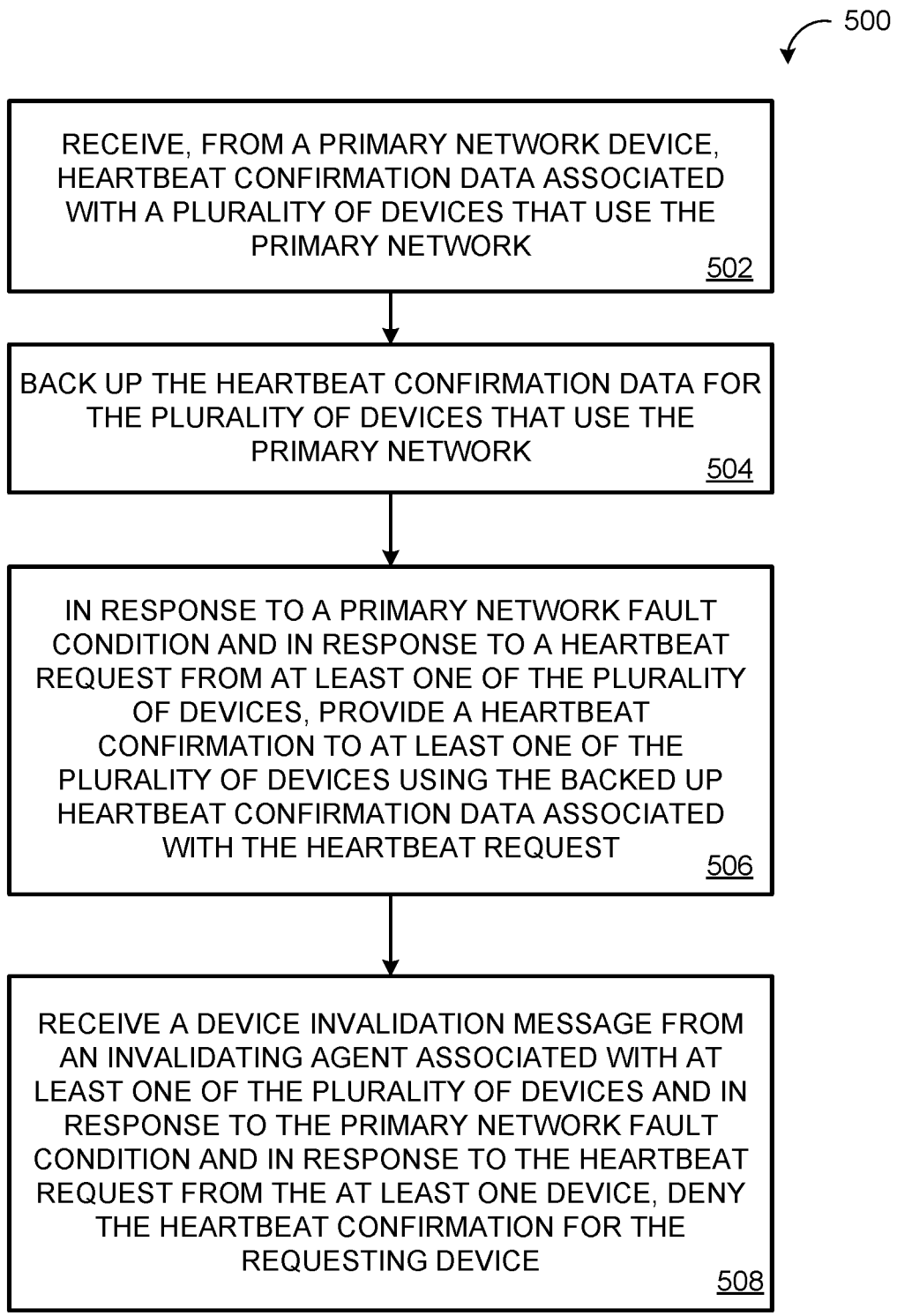
FIG. 5 is a flowchart of an example arrangement of operations for a method of providing operational reliability for a communication device adapted to communicate with a primary network.
Figure 6:
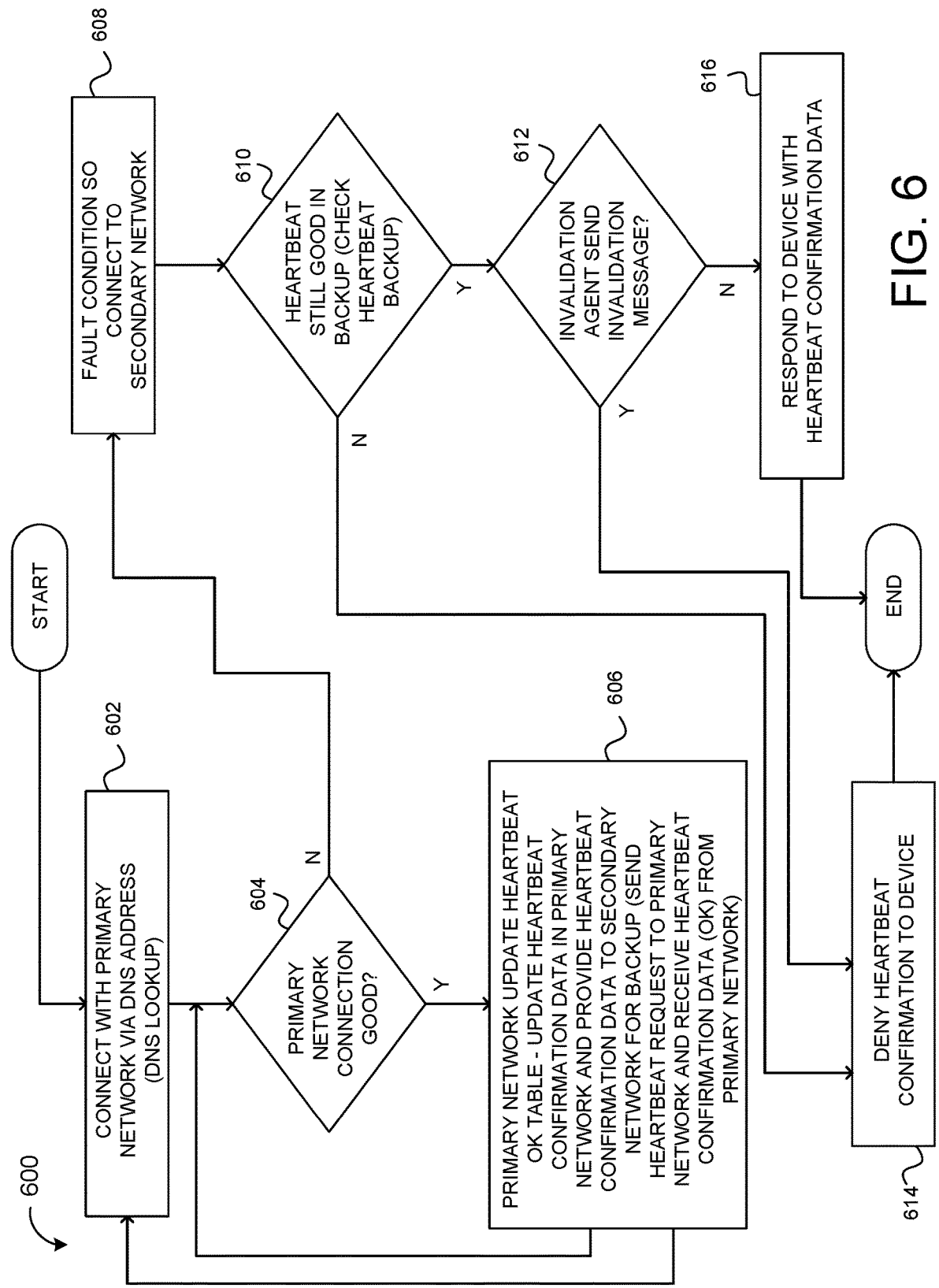
FIG. 6 is a flowchart of an example arrangement of operations for a method of providing operational reliability for a communication device adapted to communicate with a primary network.

In some examples, the secondary network 104 includes a backup network device 300. The backup network device 300 may be referred to as a fallback network device 300, backup device 300, or a mirror network device 300. The network device 300 may be one or more servers such as web servers that communicate with one or more of the communication devices 106. As such, the backup network device 300 includes data processing hardware 310 and memory hardware 320 in communication with the data processing hardware 310. The memory hardware 320 may store instructions, that when executed on the data processing hardware 310, cause the data processing hardware 310 to perform operations such as those described with respect to flowcharts 400, 500, and 600 (FIGS. 4-6). In this example, the backup network device 300 of the secondary network 104 stores, or mirrors, a subset of the device state data 110 that is stored in in the datastore 212 of the primary network 102 by the primary network device 200. The subset of state data 110 obtained from the primary network 102 is backed up by the backup network device 300 and is shown in FIG. 1 as backed-up device state data 110. Hence, the network device 300 serves as a backup, or fallback, device for a subset of the device state data 110, e.g., during a network fault condition 130 associated with the primary network 102 as perceived by the communication device 106. The subset of state data 110 is provided by the primary network 102 through any suitable mechanism including being pushed to the secondary network 104 or pulled by the secondary network 104 as part of a backup operation associated with a cloud instance of an application running in the cloud. A software application executing on the backup device 300 may perform the backup operation. In this example, the secondary network 104 is a smaller cloud network than that of the primary network 102 thereby reducing cost and operational complexity of a backup system. In addition, the backup device 300 in the secondary network 104 only backs up a subset of the state data 110 that is kept by the primary network 102 for each of the devices that are in communication with the primary network 102, thereby reducing storage cost and operational complexity. For example, the secondary network 104 may not allow communication devices 106 to newly register. I.e., in some implementations, the backup device 300 does not execute a Web Registration Service.

The network system 100 also includes an invalidation agent 120 (e.g. heartbeat invalidation agent 120 (FIG. 1)) that may be any suitable device that is authorized to invalidate a communication device 106 with respect to the primary network 102 and the secondary network 104. The invalidation agent 120 may provide corresponding invalidation data 124, 124a to the primary network device 200 associated with the primary network 102 and/or corresponding invalidation data 124, 124b to the backup device 300 associated with the secondary network 104. A software service provider, system administrator, or other entity may employ the invalidation agent 120 to identify particular communication devices 106 that should not receive heartbeat confirmation signals 126 from the network 102, 104 when requested (e.g., via heartbeat requests 128) from those particular communication devices 106. More specifically, the invalidation data 124 invalidates a particular communication device 106 from the ability to perform tasks or operations by instructing the primary network device 200 and/or the backup device 300 to not transmit heartbeat confirmation signals 126 to the particular communication device 106. The invalidation agent 120 may determine that a resource necessary for the communication device 106 to perform the device operation is unavailable to the communication device 106. This may be done in a CBRS system, for example, if the invalidation agent 120 determines that a particular frequency or set of frequencies are not available from base station 106c for use by communication device 106b. For example, a frequency or certain frequencies used by one or more base stations (e.g., 106c) in a CBRS system may be determined by the system and/or the invalidation agent 120 to be in use by a governmental entity and are unavailable for use by non-governmental devices. Communication device 106b can be prevented from attempting to access those frequencies. In other systems, an Internet of Things (IoT) device 106a may be prevented from using the primary network 102 when a software update is required, when the owner of the communication device is out of compliance with contractual agreements made in connection with software usage, or other criteria.

The backup device 300 includes memory such as a backup datastore 318 that stores the backed-up subset of device state data 110, including heartbeat confirmation data 118. The heartbeat confirmation data 118 includes a copy of the valid heartbeat confirmation data 118 that is obtained from the primary network 102. In some implementations, the invalidation data 124a provided to the primary network device 200 is propagated to the backup device 300 and stored in the backup datastore 318. For instance, the subset of state data 110 backed up by the backup network device 300 may include data representing the mapping of data between the communication device and the invalidation agent 120. In some implementations, the invalidation data 124b provided to the backup network device 300 is stored in the backup datastore 318. In another example, only keep alive signal data 118 (heartbeat confirmation data) is backed up by the secondary network 104. This can allow for a small use of memory such as in a table format.

As such, the backup device 300 of the secondary network 104 backs up only operational reliability information of a particular communication device that is communicating with the primary network 102. In one example, only the keep alive signal data, also referred to as the heartbeat confirmation data 118, is backed up from the primary network 102. The heartbeat confirmation data 118 is associated with an ongoing communication or task performed by a device with the primary network 102, and may indicate that primary network device 200 of the primary network 102 permits the communication device 106 to continue performing the task or operation in the presence of a network fault condition 130 preventing communication between the communication device 106 and the primary network device 200. In some implementations, the invalidation data 124b is provided directly to the backup device 300 during network fault conditions 130 associated with the primary network 102. The operations described herein provide a type of If This Then That—level of functionality for the heartbeat deauthorization to still propagate, rescinding permission for the communication device to continue performing tasks or operations during network fault conditions 130 associated with the primary network 102. For instance, the invalidation agent 120 may transmit an invalidation message 122 to the backup device 300 when the invalidation agent 120 detects a network fault condition 130 associated with the primary network 102. The network system 100 and methods 400, 500, 600 offer a very simple technique for configuring and handling heartbeat-signal protocols. As noted above, the system, in one example, is composed of a primary service and a heartbeat-only backup service. The primary service is run on cloud infrastructure of the primary network 102 whereas the heartbeat-only service is run on an entirely separate cloud infrastructure, namely the secondary network 104, with the ability to confirm operability by the secondary network 104 to the device 106 in response to a network fault condition 130 associated with the primary network 102.

Figure 2:
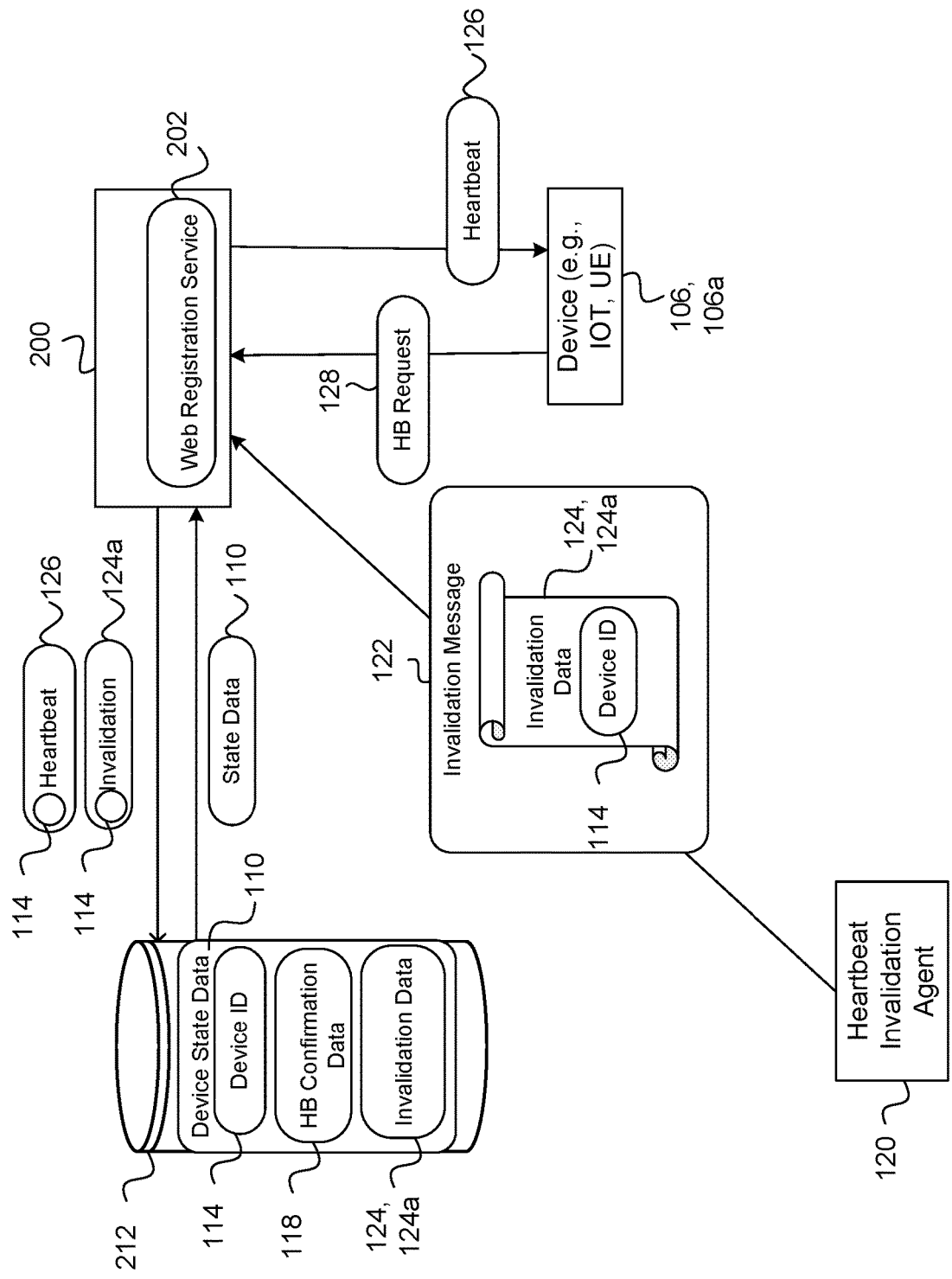
FIG. 2 is a schematic view of an example network device employed in the primary network of the network system of FIG. 1.

Referring to FIG. 2, the network device 200 may execute a Web Registration Service 202, and communication devices 106 may register with the Web Registration Service 202 to receive a heartbeat signal 126 (also referred to as a heartbeat confirmation signal, a keep alive signal, or simply a heartbeat) to permit the communication devices 106 to initiate or to continue to perform tasks or operations. In the example shown, a communication device 106 may send the heartbeat request 128 to the network device 200 and receive a corresponding heartbeat confirmation signal 126. In some implementations, communication devices 106 continuously receive heartbeat signals 126 (e.g., at regular intervals) and continue to perform tasks or operations responsive to receiving the heartbeat signals 126. In some examples, for a particular communication device 106 communicating with the network device 200 (e.g., via communication of heartbeat requests 128 and corresponding heartbeat confirmation signals 126), the network device 200 records device state data 110 together with a device identifier (ID) 114 associated with the particular communication device 106 in a device state datastore 212. The device ID 114 may uniquely identify the communication device 106. The device state data 110 may include any information related to operations or tasks performed by the communication device 106, such as, without limitation, data representing payment status, an ability to update organizational metadata, aggregation calculations of overall environment health, and/or any other suitable data. The device ID 114 may be used as an index, e.g., to look up or identify the device state data 110 stored in the datastore 212 and associated with the particular communication device 106. The device state data 110 associated with a particular communication device 106 may be updated over time using the device ID 114 as an index. For example, the network device 200 may update the device state data 110 as the communication device 106 continues to perform tasks or operations responsive to receiving heartbeat confirmation signals 126 from the network device 200. In some examples, the device state data 110 includes heartbeat confirmation data 118 associated with heartbeat confirmation signals 126 sent to the communication device 106 by the network device 200 to permit the communication device 106 to perform tasks or operations.

In some implementations, the network device 200 updates the heartbeat confirmation data 118 each time the network device 200 sends a heartbeat signal 126 to the communication device 106. As such, the heartbeat confirmation data 118 may provide a log of timestamped heartbeat requests 128 received from the communication device 106 and timestamped heartbeat signals 126 sent to the communication device 106. In the example shown, the device state data 110 may reflect the most recent time the network device 200 permitted the communication device 106 to initiate or to continue to perform tasks or operations. In some examples, the network device 200 receives an invalidation message 122 from an invalidation agent 120. The invalidation message 122 may contain heartbeat invalidation data 124, 124a indicating that the communication device 106 should not receive any heartbeat confirmation signals 126 from the primary network device 200. For example, an Internet-of-Things (IoT) device 106a may be prevented from using the primary network 102 when the IoT device 106a requires a software update to address a potential security vulnerability, or when the owner of the IoT device 106a fails to comply with contractual agreements, such as obtaining or maintain valid software licenses. The invalidation message 122 may contain heartbeat invalidation data 124, 124a including an indication of these criteria or other criteria that a communication device 106 should not receive any heartbeat confirmation signals 126 from the primary network device 200 as possible. The invalidation data 124a may contain the device identifier 114 (e.g., device ID 114 (FIG. 1)) identifying the particular communication device 106 that should not receive heartbeat confirmation signals 126 containing heartbeat confirmation data 118 indicative of permission by the primary network device 200 (e.g., by the Web Registration Service 202) for the particular communication device 106 to perform tasks or operations. Accordingly, in response to receiving invalidation data 124a contained in an invalidation message 122 from the invalidation agent 120 (e.g. heartbeat invalidation agent 120 (FIG. 1)), the network device 200 may decline to transmit a heartbeat confirmation signal 126 to the communication device 106 identified by the invalidation data 124a. For instance, when the network device 200 receives a heartbeat request 128 from a communication device 106 for performing a task or operation, the network device 200 may query the datastore 212 using the associated device ID 114 to determine whether the device state data 110 for the communication device 106 includes invalidation data 124. When invalidation data 124 exists, the network device 200 may decline to transmit a corresponding heartbeat confirmation signal 126 to the communication device 106, thereby preventing the communication device 106 from performing the task or operation. In some examples, when the network device 200 ceases the transmission of heartbeat confirmation signals 126 to the communication device 106, the network device 200 stops updating the heartbeat confirmation data 118 in the device state data 110. In some examples, the device state data 110 includes the received invalidation data 124a. As such, the network device 200 may be configured to update the device state data 110 with invalidation data 124a received from the invalidation agent 120 indicating that the particular communication device 106 should no longer receive heartbeat confirmation signals 126 from the network device 200.

Figure 3:
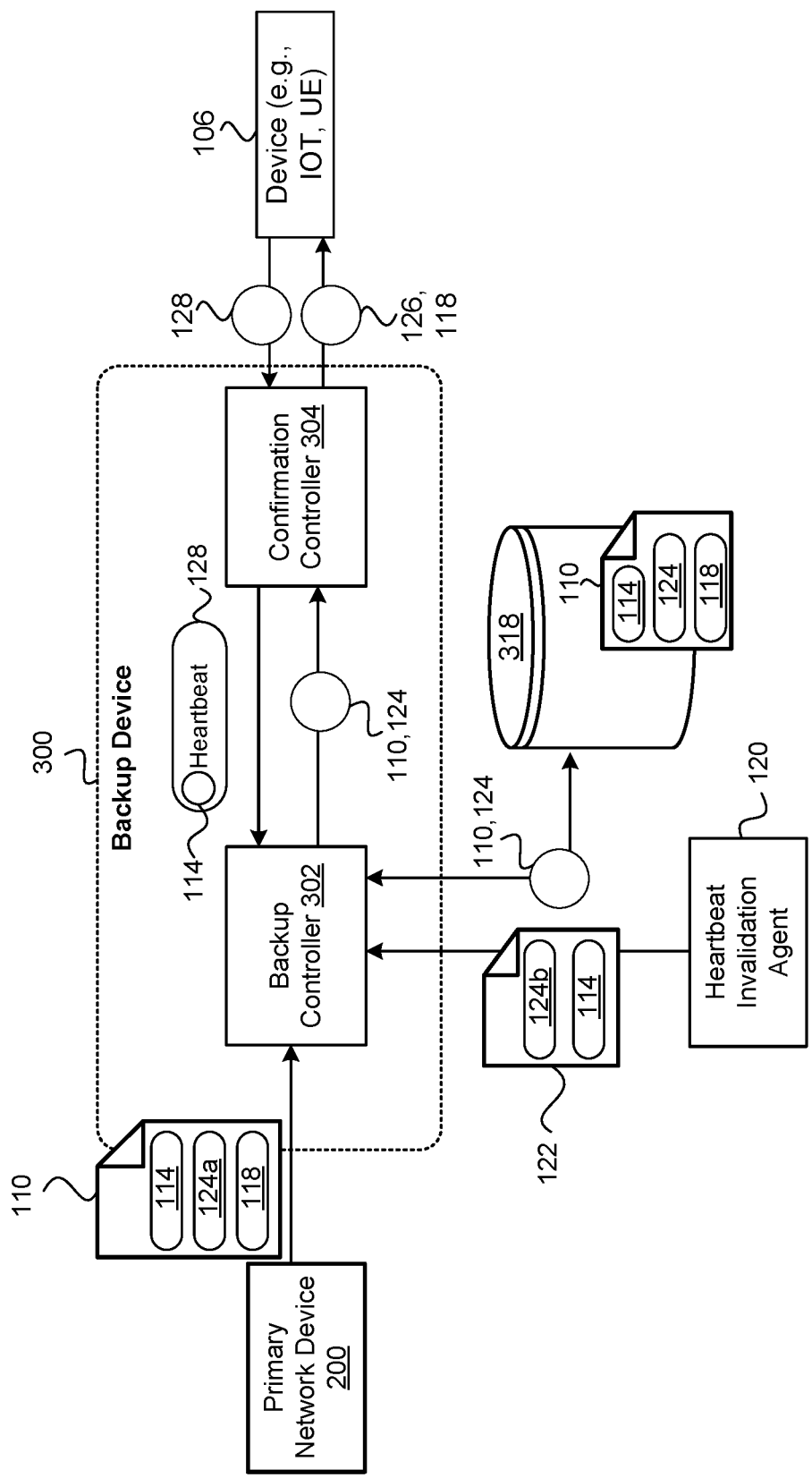
FIG. 3 is a schematic view of an example backup device employed in the secondary network of the network system of FIG. 1.

Referring to FIG. 3, the backup device 300 may execute a backup controller 302 and a confirmation controller 304. The confirmation controller 304 may be referred to as a backup confirmation controller 304 or a heartbeat confirmation controller 304. In some examples, a network fault condition 130 (FIG. 1) associated with the primary network 102, as perceived by the communication device 106, may occur. For example, the communication device 106 may be unable to connect to the primary network 102 or may fail to receive a heartbeat confirmation 126 within a threshold period of time after sending a heartbeat request 128. The network fault condition 130 associated with the primary network 102 may be caused by a power outage that affects the primary network 102 or a damaged communication cable or fiber, or any other failure that prevents communication between the communication device 106 and the primary network 102. In some examples, the network fault condition 130 is due to a failure of the ability of the communication device 106 to communicate with the primary network 102 even though the primary network 102 is otherwise operational. Other sources of the network fault condition 130 may apply as well. In some examples, when the communication device 106 fails to receive a heartbeat confirmation 126 within a threshold period of time, the communication device 106 attempts to re-register with the Web Registration Service 202. In these examples, a network fault condition 130 may be established when the communication device 106 is unable to re-register with the Web Registration Service 202 within a connection timeout period. Since the communication device 106 may not receive heartbeat confirmation signals 126 from the primary network 102 during the network fault condition 130, the communication device 106 will cease performing tasks or operations conditioned upon receiving periodic heartbeat confirmation signals 126. In some examples, during a network fault condition 130 associated with the primary network, the communication device 106 is configured to initiate communication with the secondary network 104 in lieu of the primary network 102. That is, the secondary network 104 may provide a fallback for servicing heartbeat requests 128 from the communication device 106 and issuing heartbeat confirmation signals 126 to the communication device 106 during network fault conditions 130 when the communication device 106 is unable to receive heartbeat confirmation signals 126 from the primary network device 200 of the primary network 102. In the example shown, the communication device 106 sends a heartbeat request 128 to the backup heartbeat confirmation controller 304 of the backup device 300 during the network fault condition 130 and receives a corresponding heartbeat confirmation signal 126 (also referred to as a keep alive signal) to permit the communication device 106 to continue to perform tasks or operations despite the inability of the communication device 106 to communicate with the primary network device 200 of the primary network 102. Here, before sending the heartbeat confirmation signal 126 to the communication device 106, the backup heartbeat confirmation controller 304 may first query the backup controller 302 to determine whether the backed-up device state data 110 associated with the communication device 106 indicates that the communication device 106 is permitted to receive heartbeat confirmation signals 126.

In the example shown, the device heartbeat backup controller 302 receives at least a subset of device state data 110 from the primary network device 200 of the primary network 102. The subset of state data 110 may include heartbeat confirmation data 118, the device ID 114 associated with the communication device 106, and any invalidation data 124a the primary network registration device 200 (e.g. primary network device 200 (FIG. 1)) received from the heartbeat invalidation agent 120. In some examples, the received state data 110 (e.g., device state data 110 (FIG. 1)) includes all the state data 110 associated with the communication device 106 that is stored in the device state datastore 212 of the primary network 102 as described previously. In some examples, the received state data 110 only includes the heartbeat confirmation data 118. Other subsets of the state data 110 may be received by the backup controller 302. In some implementations, the primary network device 200 pushes the device state data 110 to the backup controller 302 while the primary network device 200 is sending heartbeat confirmation signals 126 to the communication device 106. In these implementations, the primary network device 200 may push the device state data 110 associated with the communication device 106 to the backup controller 302 at periodic intervals, when the state data 110 changes, or under any other suitable circumstances. In additional implementations, the backup controller 302 of the backup device 300 pulls the device state data 110 from the primary network 102 during a pull operation. For example, the backup controller 302 may pull the device state data 110 from the primary network device 200 as part of a scheduled backup operation and/or responsive to the backup confirmation controller 304 receiving a heartbeat request 128 from the communication device. For instance, the backup controller 302 may pull a subset of state data 110 for one or more communication devices 106 by querying the primary network device 200 with the associated one or more device IDs 114. In some examples, the backup controller 302 backs up the device state data 110 received from the primary network device 200 in a backup datastore 318. As with the device state datastore 212 of FIG. 2, the backup datastore 318 may index the received device state data 110 stored therein using the device ID 114 identifying the communication device 106 associated with the device state data 110. In one example, the backup device 300 includes a look-up table, indexed by the device ID 114. Other techniques for storing, indexing, looking-up, and retrieving the received device state data 110 from the backup datastore 318 are possible as well.

As described above with reference to FIG. 2, the received device state data 110 may reflect the most recent time the network device 200 permitted the communication device 106 to initiate or to continue to perform tasks or operations. Accordingly, the received device state data 110 stored in the backup datastore 318 may reflect the most recent time the network device 200 permitted the communication device 106 to initiate or to continue to perform tasks or operations. Here, the device state data 110 received by the backup controller 302 may also include heartbeat invalidation data 124, 124a previously received by the primary network device 200 of the primary network 102 in an invalidation message 122 from the invalidation agent 120. That is, the device heartbeat backup controller 302 may receive invalidation data 124, 124a indirectly via the primary network 102, rather than directly from the heartbeat invalidation agent 120. Accordingly, the received device state data 110 stored in the backup datastore 318 may reflect the indication that the communication device 106 should not receive any heartbeat confirmation signals 126. In some examples, the backup controller 302 receives an invalidation message 122 directly from an invalidation agent 120. The invalidation message 122 may contain heartbeat invalidation data 124, 124b (e.g., invalidation data 124, 124b (FIG. 1)) indicating that the communication device 106 should not receive any heartbeat confirmation signals 126 from the backup confirmation controller 304 of the secondary network 104 in response to the communication device 106 sending a heartbeat request 128 to the backup confirmation controller 304. The invalidation data 124b may contain the device ID 114 identifying the particular communication device 106 that should not receive heartbeat confirmation signals 126 containing heartbeat confirmation data 118 that would otherwise permit the particular communication device 106 to perform tasks or operations. The invalidation agent 120 may provide corresponding invalidation data 124, 124a to the primary network device 200 associated with the primary network 102 and/or corresponding invalidation data 124, 124b to the backup controller 302 associated with the secondary network 104. In some examples, the invalidation agent 120 transmits invalidation messages 122 to the backup device 300 of the secondary network 104 only in the presence of a network fault condition 130. For instance, the invalidation agent 120 may transmit an invalidation message 122 containing invalidation data 124b to the backup controller 302 when the invalidation agent 120 detects, or otherwise learns of, a network fault condition 130 preventing communication between a particular communication device 106 and the primary network device 200 of the primary network 102. In some examples, responsive to receiving an invalidation message 122 associated with a particular communication device 106, the backup controller 302 updates the device state data 110 stored in the backup datastore 318 to include the invalidation data 124b associated with the communication device 106, e.g., indexed by the device ID 114. In the example shown, the heartbeat invalidation agent 120 may use invalidation data 124 associated with the communication device 106 to invalidate any heartbeat confirmation data 118 associated with the communication device 106 during a network fault condition 130 associated with the primary network, thereby preventing the backup controller 302 of the backup device 300 from sending any heartbeat confirmation signals.

In some examples, responsive to receiving a heartbeat request 128 from a communication device 106, the backup heartbeat confirmation controller 304 determines whether to send a heartbeat confirmation 126 to the communication device 106 to permit the communication device 106 to initiate or to continue to perform tasks or operations. The heartbeat confirmation controller 304 may determine whether to send a heartbeat confirmation signal 126 to the communication device 106 based on the backed-up device state data 110 stored in the backup datastore 318. Here, the backup confirmation controller 304 may query the backup controller 302 to retrieve the backed up device state data 110 from the backup datastore 318 using the associated device ID 114. In some examples, the backup heartbeat confirmation controller 304 provides the heartbeat request 128 and associated device ID 114 to the backup controller 302. The backup controller 302 may retrieve the backed-up device state data 110, e.g. using the associated device ID 114 and provide the backed-up device state data 110 to the backup heartbeat confirmation controller 304. In some examples, the backup heartbeat confirmation controller 304 retrieves the backed-up device state data 110 directly from the backup datastore 318. The backup heartbeat confirmation controller 304 may use other techniques to retrieve the backed-up device state data 110. In the alternative, the backup controller 302 may determine that the retrieved backed-up device state data 110 includes heartbeat confirmation data 118 without any invalidation data 124 and provides a signal to the backup confirmation controller 304 indicating that communication device 106 should receive the heartbeat confirmation signal 126. In some examples, the backup controller 302 provides the retrieved backed-up device state data 110 to the backup heartbeat confirmation controller 304 and the backup heartbeat confirmation controller 304 determines whether or not to send a heartbeat confirmation signal 126 to the communication device 106 based on the backed-up device state data 110. For instance, if the device state data 110 includes heartbeat confirmation data 118 and no invalidation data 124 is present, the backup confirmation controller 304 may determine to send the heartbeat confirmation signal 126 to the communication device 106. As described above, the heartbeat confirmation data 118 may reflect the most recent time the network device 200 permitted the communication device 106 to initiate or to continue to perform tasks or operations. In some examples, the backup heartbeat confirmation controller 304 may determine to send a heartbeat confirmation 126 to the communication device 106 when the heartbeat confirmation data 118 in the backup datastore 318 indicates that the network device 200 previously permitted the communication device to initiate or to continue to perform tasks or operations. The backup heartbeat confirmation controller 304 may determine not to send a heartbeat confirmation 126 to the communication device 106 when the backed-up device state data 110 does not include heartbeat confirmation data 118 associated with the communication device 106. Other techniques for determining whether to send a heartbeat confirmation 126 to the communication device 106 based on the heartbeat confirmation data 118 are possible. In some examples, when the backup heartbeat confirmation controller 304 sends a heartbeat confirmation signal 126 to the communication device 106, the backup heartbeat confirmation controller 304 updates the heartbeat confirmation data 118 associated with the communication device 106 in the backup datastore 318.

The backed-up device state data 110 may include invalidation data 124 received indirectly by the backup controller 302 via the primary network device 200 of the primary network 102 as part of device state data 110 received by the backup controller 302 during a push or pull operation or received directly from the invalidation agent 120 and stored in the backup datastore 318. Similarly, if the heartbeat invalidation agent 120 provides invalidation data 124b to the controller 302 while the controller 302 is performing a backed-up device state data 110 retrieval operation, the backup controller 302 may simply append the invalidation data 124 to the backed-up device state data 110 being sent to the backup confirmation controller 304. In some examples, based on the invalidation data 124, the backup confirmation controller 304 may decline to transmit a heartbeat confirmation signal 126 to the communication device 106 identified by the invalidation data 124 (e.g., heartbeat invalidation data 124 (FIG. 1)). For instance, when the backup confirmation controller 304 receives a heartbeat request 128 from a communication device 106 for performing a task or operation, the backup confirmation controller 304 (or the backup controller 302) may query the backup datastore 318 using the device ID 114 to determine whether the device state data 110 associated with the communication device 106 includes invalidation data 124. When invalidation data 124 exists, the backup confirmation controller 304 may rescind permission for the communication device 106 to perform the device operation and withhold, or decline to transmit, a corresponding heartbeat confirmation signal 126 to the communication device 106, thereby preventing the communication device 106 from performing the task or operation.

FIG. 4 is a flowchart of an example arrangement of operations for a method 400 of providing operational reliability for a communication device 106 adapted to communicate with a primary network 102. At operation 402, in the presence of a network fault condition 130 preventing communication between a communication device 106 and a network device 200 (e.g., primary network device 200 (FIG. 1)) of a first network 102 (e.g., primary network 102 (FIG. 1)), the method 400 includes receiving, at data processing hardware 310 of a second network 104 (e.g., backup network 104 or secondary network 104 (FIG. 1)), from the communication device 106, a heartbeat request 128 requesting permission for the communication device 106 to perform a device operation. In some implementations, the communication device 106 is configured to send the heartbeat request 128 to the network device 200 of the first network 102 and receive a corresponding heartbeat confirmation signal 126 from the network device 200 when the network fault condition 130 is not present. In some scenarios, the network fault condition 130 is present when the communication device 106 does not receive a heartbeat confirmation signal 126 from the network device 200 of the first network 102 within a threshold period of time after sending a heartbeat request 128 to the network device 200.

At operation 404, the method 400 includes obtaining, by the data processing hardware 310, device state data 110 associated with the communication device 106. For example, the data processing hardware 310 may receive the device state data 110 directly or indirectly from the network device 200 of the first network 102. For instance, the network device 200 may periodically push the device state data 110 to the data processing hardware 310 when communication between the communication device 106 and the network device 200 is not degraded (e.g., the fault condition 130 is not present), and the data processing hardware 310 may store the device state data 110 in a backup data store 318. Thus, the data processing hardware 300 may access the backup data store 318 during the network fault condition 130 to retrieve device state data 110 stored therein for a particular communication device 106. Additionally or alternatively, the data processing hardware 310 may perform a pull operation to obtain the device state data 110 from the network device 200. Here, the data processing hardware 310 may perform the pull operation by querying the network device 200 to retrieve the device state data 110 for the particular communication device 106. The query may include a device identifier 114 identifying the communication device 106 so that the network device 200 can retrieve the associated device state data 110 from a datastore 212.

At operation 406, the method 400 includes determining, by the data processing hardware 310, whether the communication device 106 is permitted to perform the device operation based on the device state data 110 associated with the communication device 106. For example, when the device state data 110 includes heartbeat confirmation data 118 indicative of permission by the network device 200 of the first network 102 for the communication device 106 to perform the device operation, the method 400 may determine that the communication device 106 is permitted to perform the device operation. However, when the device state data 110 does not include heartbeat confirmation data 118, the method 400 may determine that the communication device 106 is not permitted to perform the device operation. Furthermore, when the device state data 110 includes invalidation data 124 despite having heartbeat confirmation data 118, method 400 may determine that the communication device 106 is not permitted to perform the device operation.

At operation 408, the method 400 includes, when the communication device 106 is permitted to perform the device operation, transmitting, by the data processing hardware 310, a heartbeat confirmation signal 126 to the communication device 106. Here, the heartbeat confirmation signal 126 permits the communication device 106 to perform the device operation. Alternatively, in scenarios when the communication device 106 is not permitted to perform the device operation (e.g., no heartbeat confirmation data 118 and/or device state data 110 includes invalidation data 124), the data processing hardware 310 may withhold transmission of the heartbeat confirmation signal 126 to the communication device 106, thereby preventing the communication device 106 from performing the device operation.

Referring to FIGS. 5 and 6, one example of the operation of a backup device 300 will be described. In some implementations, the device heartbeat backup controller 302 backs up a subset of device state data 110 from the primary network 102 that includes heartbeat confirmation data 118 that was stored as device state data 110, for one or more communication devices 106, 106a-106e that uses the primary network 102. The backup occurs by storing the subset of state data 110 in the datastore 318 on a per-device identifier 114 basis. For example, datastore records may include a device identifier 114 for each of the communication devices 106a-106e along with corresponding heartbeat confirmation data 118 that the primary network 102 stored as device state data 110. A network fault condition 130 may occur, such as an inability of IoT device 106a to connect to the primary network 102 as indicated by an IP address failure resulting from a DNS attempt to connect to the primary network 102 by the device that makes a heartbeat request 128 to the primary network 102.

In one example, the network fault condition 130 is indicated by the device, such as communication device making an Internet protocol address request through a DNS to the secondary network 104 because the communication device was unable to receive a proper response when it attempted to connect to the primary network 102 via a DNS attempt once connected to the secondary network 104 (the backup device) 300. The IoT device 106a issues a heartbeat request 128 to the secondary network 104. In response to the heartbeat request from the device, the backup heartbeat confirmation controller 304 provides a heartbeat confirmation 126 to the communication device 106 based on the backed up heartbeat confirmation data 118 that is associated with the heartbeat request 128 from the device. In one example, the backup heartbeat confirmation controller 304 uses the device ID 114 submitted by the IoT device 106a as part of the heartbeat request 128 to look up device state data 110 in the backup datastore 318. The heartbeat confirmation controller 304 may determine whether the received device ID 114 matches a device ID 114 that is stored as part of the subset of device state data 110. If the device ID 114 was backed up, the corresponding backed-up heartbeat confirmation data 118 is used to return a heartbeat confirmation 126 to the communication device 106. The communication device then can continue its task such as continue executing an in-memory program that does not require the primary network 102 to be operating.

With continued reference to FIGS. 5 and 6, where an invalidation agent 120 is used in the system 100, a software service provider, system administrator or other entity can use the invalidation agent 120 to designate a particular communication device using the device identifier 114 to indicate that the communication device is not to receive a heartbeat confirmation 126 from a network (e.g., primary network 102 or secondary network 104) in response to a heartbeat confirmation request 128 from the communication device 106. This may be done, for example, if the invalidation agent 120 determines, for example, that a particular frequency or set of frequencies are not available from base station 106c for use by communication device 106b. Communication device 106b can be prevented from attempting to access certain frequencies. This may be suitable in a CBRS type system. For example, a frequency or certain frequencies used by one or more base stations (e.g., 106c) in a CBRS system may be determined by the system and/or the invalidation agent 120 to be in use by a governmental entity or devices and are therefore unavailable for use by non-governmental devices. When particular frequencies are not being used by the base station, for example, the frequencies are considered available for public use by user equipment and the heartbeat confirmation 126 may then be sent from the secondary network 104 to a respective IoT device 106a. In other systems, an Internet of Things (IoT) device may be prevented from using the primary network 102 when a software update is required, when the owner of the communication device is out of compliance with contractual agreements made in connection with software usage, or based on any other desired criteria. Digital policy certificates or other mechanisms may be employed in determining when to send invalidation data 124a and/or 124b to a respective network. In addition, the operation will be described in connection with using multiple end-user communication devices 106. However, the system may be employed with any suitable number of end-user communication devices 106 as desired. In addition, the description with respect to FIGS. 5 and 6 is done in the context of the subset of state data 110 being only heartbeat confirmation data 118 associated with each of a plurality of devices that use the primary network 102, as opposed to other examples where the subset of state data includes more than heartbeat confirmation data 118.

As shown in block 502, the method 500 includes the backup device 300 receiving, from the primary network device 200, only heartbeat confirmation data 118 (and corresponding device ID 114) associated with a plurality of devices that use the primary network 102. The heartbeat confirmation data 118 that is backed up is a subset of the device state data 110 that the server 200 maintains for each respective device. As shown in block 504, the method includes backing up only the heartbeat confirmation data 118 for the plurality of devices that use the primary network 102. This is done by the device heartbeat backup controller 302 backing up only the heartbeat confirmation data 118 from the primary network 102. As shown in block 506, the method includes, in response to a network fault condition 130 and in response to a heartbeat request 128 from at least one of the plurality of devices, providing a heartbeat confirmation 126 based on the heartbeat confirmation data 118 that was backed up, to at least one of the plurality of devices. This is done by the backup heartbeat confirmation controller 304 in this example.

As shown in block 508, where invalidation data 124b for the secondary network 104, such as through an invalidation message 122 from the invalidating agent 120, and in response to the network fault condition 130, and in response to the heartbeat request 128 from the at least one device, denying a heartbeat confirmation 126 for the requesting device when the invalidation data 124b indicates to invalidate the communication device 106. Stated another way, the invalidation message 122 can come at any time. If the invalidation message 122 is sent after the heartbeat confirmation 126 was already sent, a subsequent heartbeat request 128 will be denied because the invalidation data 124b will be used to indicate that the invalidation agent 120 no longer wishes the communication device to have a heartbeat confirmation 126.

In another example, no heartbeat confirmation 126 will be sent if upon an initial heartbeat request 128 from the device after a network fault condition 130 occurs, the invalidation data 124b indicates that the communication device is invalid, the backup heartbeat confirmation controller 304 will not issue a heartbeat confirmation 126. In one example, the invalidation data 124 is stored as part of a data record on a per-device basis so that the backed-up device state data includes a device identifier 114 for each device of interest, the corresponding backed up heartbeat confirmation data 118 from the primary network 102 and any invalidation data 124b that has been received for the particular communication device from invalidation agent 120. As such, the invalidation data 124b in one example includes the device ID 114 plus the data indicating whether to invalidate a communication device 106. As such, the backup device 300 denies a heartbeat confirmation 126 for the communication device making the heartbeat request 128 based on an invalidating message 122 from the invalidation agent 120.

Referring to FIG. 6, from a system perspective, as shown in block 602, the method 600 includes the device registering or connecting with the primary network 102 via a DNS address. As shown in block 604, if the connection is successful, the method continues to block 606 where the server 200 (e.g., primary network device 200 (FIG. 1)) updates a heartbeat okay (heartbeat confirmation data) 118 table stored as device state data 110. This includes, for example, placing data in a memory table, database record or other format to indicate that a heartbeat confirmation 126 has been sent to device that had requested a heartbeat. The server 200 also provides the heartbeat confirmation data 118 to the secondary network 104 as part of a backup operation. Heartbeat confirmation data 118 will continually be provided by the primary network 102 as long as the primary network is operating properly. However, if there is a network fault condition 130 associated with the primary network 102 as perceived by the communication device 106, such as IoT device 106a, for example, as shown in block 608, the communication device will then attempt connection to the secondary network 104 via the DNS. As shown in block 610, the backup device 300 and in this example, the backup heartbeat confirmation controller 304 checks the backed up state data in the backup datastore 318 based on the device ID 114 to determine if the backed up data indicates that the heartbeat most recently stored by the primary network 102 indicates that a heartbeat confirmation 126 was provided by the primary network 102 by the device before the network fault condition 130. As shown in block 612, the backup network device 300 also checks the database record associated with the device to see if the invalidation agent 120 had sent an invalidation message 122 for that device. If yes, then as shown in block 614, the secondary network 104 will deny a heartbeat confirmation 126 to the requesting communication device 106. However, if the invalidation agent 120 has not indicated to invalidate the communication device 106, as shown in block 616, the backup network device 300 will respond to the communication device that is requesting a heartbeat from the secondary network 104 with heartbeat confirmation 126 based on the heartbeat confirmation data 118 that was backed up.

Among other advantages, employing a second and smaller cloud system that keeps a copy of the valid heartbeat information, such as in a table, allows the second system to have maximum separation without having a fully rewritten software service. The secondary network 104 and backup device 300 allows the overall system to keep consistent views of the devices in the primary network 102 without having to have full constant copies of the data at all times as well as having smaller, independent software services to ensure reliability. In one example, a static page handler exists that stores only the most important aspects of operation, namely serving heartbeat confirmation signals 126 to the devices. The secondary network 104 only needs to be updated by the primary network 102 with heartbeat confirmation data 118 and makes maintaining a consistent state of the devices significantly simpler than prior methods. As used herein, the device ID 114 and corresponding heartbeat confirmation data 118 may be the same data. For example when a table is used, the mere existence of the device ID 114 in the table could serve as the heartbeat confirmation data 118 for the particular communication device.

Figure 7:
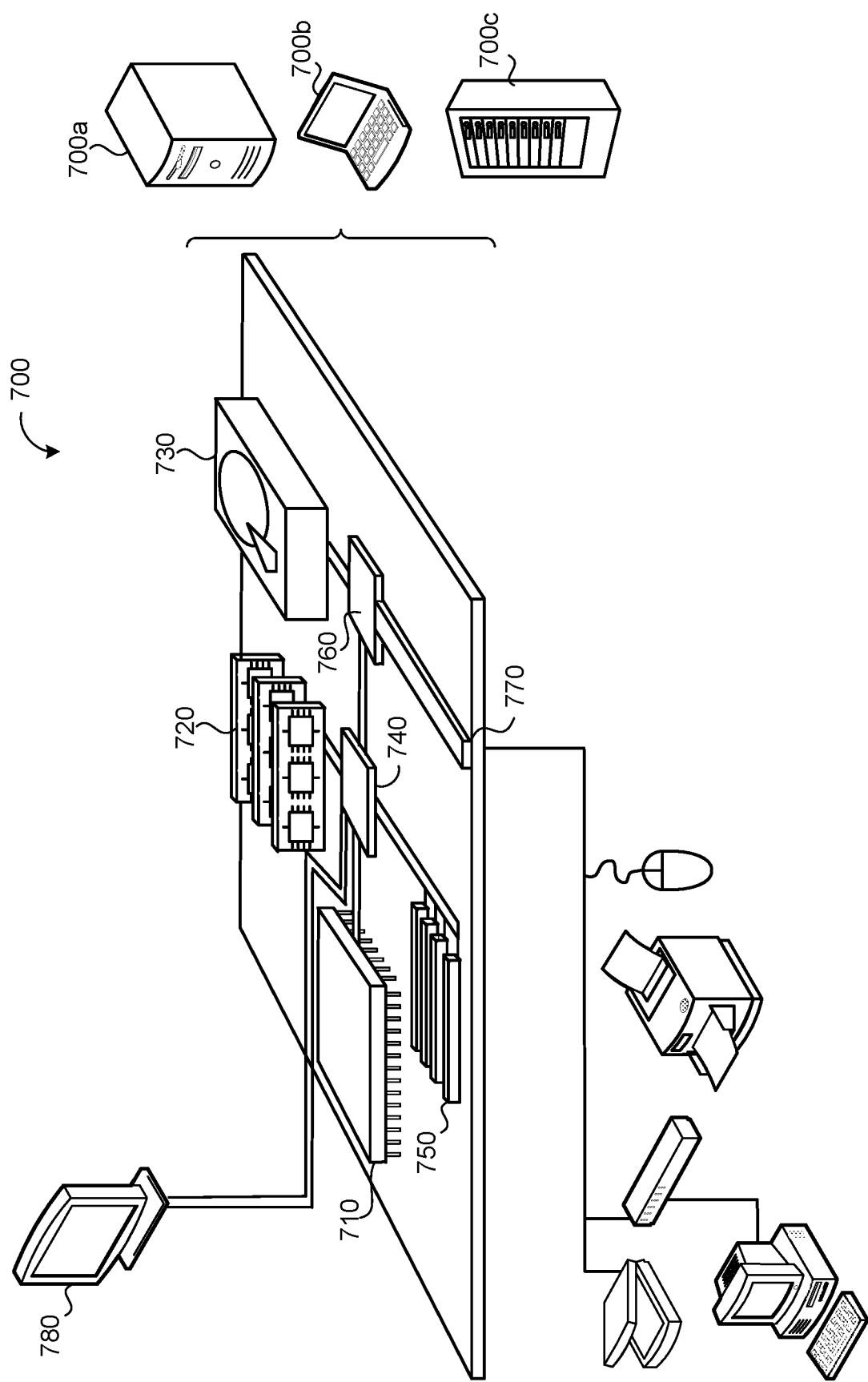
FIG. 7 is a schematic view of an exemplary computing device.

FIG. 7 is schematic view of an example computing device 700 that may be used to implement the systems (e.g., the network device 200 and the backup network device 300) and methods (e.g., the methods 400, 500, 600) described in this document. The computing device 700 is intended to represent various forms of digital computers, such as laptops, desktops, workstations, personal digital assistants, mobile computing devices, wearable computing devices (e.g., headsets and/or watches), servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710 (also referred to as processing hardware or data processing hardware), memory 720 (also referred to as memory hardware), a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid-state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high-speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Various implementations of the systems and techniques described herein can be realized in digital electronic and/or optical circuitry, integrated circuitry, specially designed ASICs (application specific integrated circuits), computer hardware, firmware, software, and/or combinations thereof.

These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A computer-implemented method executed by data processing hardware of a communication device that causes the data processing hardware to perform operations comprising:
   transmitting, to a first network device of a first network, a first heartbeat request requesting a first heartbeat confirmation signal from the first network device;
   after failing to receive the first heartbeat confirmation signal from the first network device for a threshold period of time, determining a fault condition exists;
   in response to determining that the fault condition exists, transmitting, to a second network device of a second network, a second heartbeat request requesting a second heartbeat confirmation signal from the second network device, the second network different than the first network;
   receiving, from the second network device, the second heartbeat confirmation signal; and
   in response to receiving the second heartbeat confirmation signal, performing a device operation;
   transmitting, to the second network device, a third heartbeat request requesting a third heartbeat confirmation signal from the second network device; and
   after failing to receive the third heartbeat confirmation signal from the second network device for the threshold period of time, halting performance of the device operation.

2. The method of claim 1, wherein transmitting the second heartbeat request comprises requesting permission to perform the device operation.

3. The method of claim 1, wherein the second heartbeat request is configured to cause the second network device to determine that the communication device is permitted to perform the device operation based on device state data associated with the communication device.

4. The method of claim 3, wherein the first network device is configured to at least one of:
   push the device state data associated with the communication device to the data processing hardware prior to the fault condition; or
   send the device state data associated with the communication device in response to a pull operation by the second network device.

5. The method of claim 3, wherein the device state data comprises at least one of:
   a device identifier identifying the communication device;
   invalidation data that invalidates the communication device from the ability to perform the device operation;
   operational reliability information associated with the communication device; a payment status;
   an ability of the communication device to update organizational metadata; or
   an aggregation calculation of overall environment health.

6. The method of claim 3, wherein the device state data comprises heartbeat confirmation data indicative of permission by the first network device of the first network for the communication device to perform the device operation.

7. The method of claim 1, wherein the fault condition comprises a network fault condition preventing communication between the communication device and the first network device over the first network.

8. The method of claim 1, wherein the operations further comprise:
transmitting, to the second network device, a third heartbeat request requesting a third heartbeat confirmation signal from the second network device;
receiving, from the second network device, the third heartbeat confirmation signal, the third heartbeat confirmation signal; and
in response to receiving the third heartbeat confirmation signal, continuing to perform the device operation.

9. The method of claim 1, wherein the operations further comprise, prior to transmitting, to the first network device of the first network, the first heartbeat request, registering, with the first network device, to receive heartbeat confirmation signals.

10. A system comprising:
data processing hardware of a communication device; and
memory hardware in communication with the data processing hardware, the memory hardware storing instructions that when executed on the data processing hardware cause the data processing hardware to perform operations comprising:
transmitting, to a first network device of a first network, a first heartbeat request requesting a first heartbeat confirmation signal from the first network device;
after failing to receive the first heartbeat confirmation signal from the first network device for a threshold period of time, determining a fault condition exists;
in response to determining that the fault condition exists, transmitting, to a second network device of a second network, a second heartbeat request requesting a second heartbeat confirmation signal from the second network device, the second network different than the first network;
receiving, from the second network device, the second heartbeat confirmation signal;
in response to receiving the second heartbeat confirmation signal, performing a device operation;
transmitting, to the second network device, a third heartbeat request requesting a third heartbeat confirmation signal from the second network device; and
after failing to receive the third heartbeat confirmation signal from the second network device for the threshold period of time, halting performance of the device operation.

11. The system of claim 10, wherein transmitting the second heartbeat request comprises requesting permission to perform the device operation.

12. The system of claim 10, wherein the second heartbeat request is configured to cause the second network device to determine that the communication device is permitted to perform the device operation based on device state data associated with the communication device.

13. The system of claim 12, wherein the first network device is configured to at least one of:
push the device state data associated with the communication device to the data processing hardware prior to the fault condition; or
send the device state data associated with the communication device in response to a pull operation by the second network device.

14. The system of claim 12, wherein the device state data comprises at least one of:
a device identifier identifying the communication device;
invalidation data that invalidates the communication device from the ability to perform the device operation;
operational reliability information associated with the communication device;
a payment status;
an ability of the communication device to update organizational metadata; or
an aggregation calculation of overall environment health.

15. The system of claim 12, wherein the device state data comprises heartbeat confirmation data indicative of permission by the first network device of the first network for the communication device to perform the device operation.

16. The system of claim 10, wherein the fault condition comprises a network fault condition preventing communication between the communication device and the first network device over the first network.

17. The system of claim 10, wherein the operations further comprise:
transmitting, to the second network device, a third heartbeat request requesting a third heartbeat confirmation signal from the second network device;
receiving, from the second network device, the third heartbeat confirmation signal, the third heartbeat confirmation signal; and
in response to receiving the third heartbeat confirmation signal, continuing to perform the device operation.

18. The system of claim 10, wherein the operations further comprise, prior to transmitting, to the first network device of the first network, the first heartbeat request, registering, with the first network device, to receive heartbeat confirmation signals.

* * * * *